United States Patent [19]

Tideswell et al.

[11] Patent Number: 4,544,679

[45] Date of Patent: Oct. 1, 1985

[54] POLYOL BLEND AND POLYISOCYANURATE FOAM PRODUCED THEREFROM

[75] Inventors: Richard B. Tideswell, Allison Park; Neil H. Nodelman, Pittsburgh; Barry A. Phillips, Slovan, all of Pa.

[73] Assignee: Mobay Chemical Corporation, Pittsburgh, Pa.

[21] Appl. No.: 703,849

[22] Filed: Feb. 21, 1985

[51] Int. Cl.$^4$ .................. C08G 18/14; C08G 18/30; C08G 18/48; C08G 18/79

[52] U.S. Cl. ................... 521/116; 252/182; 428/319.3; 428/422.8; 521/125; 521/126; 521/127; 521/128; 521/129; 521/173; 521/902

[58] Field of Search .................. 521/173, 116, 902

[56] References Cited

U.S. PATENT DOCUMENTS

| | | | |
|---|---|---|---|
| 3,799,898 | 3/1974 | Lamplugh et al. | 521/116 |
| 4,039,487 | 8/1977 | Kolakowski et al. | 521/125 |
| 4,246,365 | 1/1981 | Wiedermann et al. | 528/80 |
| 4,444,915 | 4/1984 | Yrube et al. | 521/173 |
| 4,444,916 | 4/1984 | Yrube et al. | 521/173 |
| 4,459,334 | 7/1984 | Blanpied et al. | 428/219 |
| 4,469,821 | 9/1984 | Anderson | 521/173 |
| 4,476,251 | 10/1984 | Cianciolo et al. | 521/116 |
| 4,485,196 | 11/1984 | Speranza et al. | 521/173 |
| 4,496,625 | 1/1985 | Snider et al. | 428/318.4 |

OTHER PUBLICATIONS

White et al., Jour. Cellular Plastics, May–Jun. 1984, pp. 215–219.

Primary Examiner—Herbert S. Cockeram
Attorney, Agent, or Firm—Gene Harsh; Joseph C. Gil

[57] ABSTRACT

The present invention is directed to a polyol blend comprising:

(a) from about 30 to about 90 percent by weight of a polyester diol having an OH number of from about 50 to about 500 and having the structure:

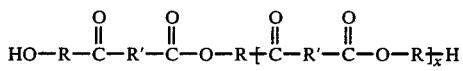

wherein each R may be the same or different and represents a radical of the formula:

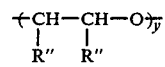

where R" represents H or CH$_3$ with the proviso that both R"s cannot be CH$_3$, and y represents a number of from 1 to 5, wherein R' represents an aromatic radical having from 6 to 12 carbon atoms, and wherein x represents a number of from 0 to 5, (b) from about 2 to about 40 percent by weight of an organic compound containing from 3 to 8 hydroxyl groups and being selected from the group consisting of (i) compounds having OH numbers of from about 250 to about 1830 and being free of carboxylic acid ester groups, (ii) compounds having OH numbers of from about 150 to about 1000 and containing at least one carboxylic acid ester group, and (iii) mixtures thereof, (c) from about 5 to about 30 percent by weight of a condensation product formed from 1 mole of a phenol and from 4 to 15 moles of ethylene oxide, and (d) from 0 to about 40 percent by weight of at least one diol of the structure:

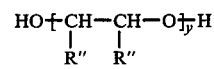

where R" and y are as defined above, and to an isocyanurate foam prepared therefrom.

16 Claims, No Drawings

POLYOL BLEND AND POLYISOCYANURATE FOAM PRODUCED THEREFROM

BACKGROUND OF THE INVENTION

The use of aromatic polyester polyols in the production of urethane modified isocyanurate foams has become widespread. The use of such polyester is described, for example, in U.S. Pat. Nos. 4,246,365 and 4,039,487. In an article entitled "The Use of a Unique Aromatic Polyester Polyol in Urethane Modified Isocyanurate Foam Systems", (SPI ANTC, pages 348-351, R. J. Wood, 1983), the use of aromatic polyester polyols combined with various polyethers and a solubilizer known as "Compatipol CP-120" is described (note Tables 1 and 2) and relatively low viscosity polyisocyanates is described. Also described in the Wood article is the use of a compatibility aid designated as "TRITON X-100", in combination with an aromatic polyester (note FIG. 1). TRITON X-100 is an ethoxylated nonyl phenol. The use of TRITON X-100 to enhance the Freon solubility of Terate polyols is also known and described in an article entitled "Development of Lower Cost Polyurethane Modified Polyisocyanurate and Polyurethane Rigid Foams" (SPI ANTC, Vol. 25, 1979, pages 6-13).

The use of aromatic polyester polyols in combination with sucrose or sucrose-amine based polyethers and low viscosity polyisocyanates is described in U.S. Pat. Nos. 4,459,334 and 4,496,625, and "New Polyols for Urethane Modified Isocyanurate Foams" (*Journal of Cellular Plastics*, May-June, 1984, K. B. White et al, pages 215-219). Polyester polyols are known which are based on aromatic acids, diethylene glycol and propylene glycol (see, e.g., Technical Data Bulletin-Firemaster PHT4-diol). It is also known that Freon solubility of a polyol produced from a dimethyl terephthalate residue can be enhanced by reacting the residue with a glycol-containing dipropylene glycol (see, e.g., U.S. Pat. No. 4,346,229).

Also known are systems based on (i) polyester diols which are produced by reacting a polyalkylene terephthalate with a diol (see, e.g., U.S. Pat. No. 4,417,001), and (ii) esterified DMI oxidation residue (see, e.g., U.S. Pat. Nos. 4,237,238, 4,394,286 and 3,647,759). The use of terephthalate ester polyols is also known (see, e.g., U.S. Pat. No. 4,100,354).

Although the various systems noted have met with some success, all suffer from one or more disadvantages relating to thermal and fire performance properties and physical properties.

DESCRIPTION OF THE INVENTION

The present invention is directed to a novel polyol blend and its use in preparing a urethane-modified isocyanurate foam. The foam produced exhibits excellent thermal and fire performance properties and physical properties. More particularly, the foams exhibit enhanced insulation values, increased number of cells and improved compressive strength. The preferred blends exhibit improved Freon solubility. Additionally, the foams produced according to the present invention have excellent fire performance properties exhibited by their passing the FM 1 calorimeter test.

The polyol blend of the present invention comprises
(a) from about 30 to about 90 percent by weight, and preferably from about 35 to about 75 percent by weight, of a polyester diol having an OH number of from about 50 to about 500, and preferably from about 100 to about 400, and having the structure:

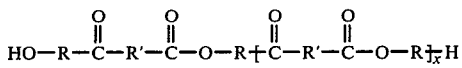

wherein each R may be the same or different and represents a radical of the formula:

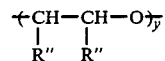

wherein R" represents H or CH$_3$ with the proviso that both R"s cannot be CH$_3$, and y represents a number of from 1 to 5,
wherein R' represents an aromatic radical having from 6 to 12 carbon atoms, and wherein x represents a number of from 0 to 5,
(b) from about 2 to about 40 percent by weight, and preferably from about 5 to about 30 percent by weight of an organic compound containing from 3 to 8 hydroxyl groups and being selected from the group consisting of
(i) compounds having OH numbers of from about 250 to about 1830 and being free of carboxylic acid ester groups,
(ii) compounds having OH numbers of from about 150 to about 1000 and containing at least one carboxylic acid ester group, and
(iii) mixtures thereof,
(c) from about 5 to about 30 percent by weight and preferably from about 5 to about 20 percent by weight of a condensation product formed from 1 mole of a phenol and from 4 to 15 moles of ethylene oxide and preferably from 7 to 12 moles of ethylene oxide, and
(d) from 0 to about 40 percent by weight, and preferably from about 5 to about 30 percent by weight of at least one diol of the structure:

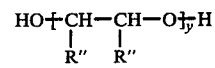

where R" and y are as defined above.

It is presently preferred that the polyester diol (a) have an OH number of from about 100 to about 400 and be derived from 1 mole of an aromatic dicarboxylic acid anhydride and from 1.5 to 4 moles of a glycol mixture, with said mixture comprising
(i) from 25 to 50 mole percent of one or more of the following: propylene glycol, dipropylene glycol, tripropylene glycol, tetrapropylene glycol and pentapropylene glycol, and
(ii) from 50 to 75 mole percent of one or more of the following: ethylene glycol, diethylene glycol, triethylene glycol, tetraethylene glycol and pentaethylene glycol.

The foams of the present invention are prepared by reacting the above-described blend with a polyphenyl polymethylene polyisocyanate having a viscosity of from about 100 to about 2500 mPa.s at 25° C. in the presence of a trimerization catalyst and blowing agent, with the components being used in an amount such that the isocyanate index is from about 140 to about 500, and preferably from about 140 to about 300. Particularly good results are obtained when the isocyanate used has a viscosity of from about 400 to about 2500 mPa.s at 25° C., and more particularly from about 500 to about 1000 mPa.s at 25° C.

The polyester diol component of the present invention can be prepared in substantially any known manner.

Thus, the polyester diols of the present invention can be prepared by reacting a molar excess of a glycol or glycol mixture with an aromatic dicarboxylic acid (or anhydride) under normal esterification conditions well known in the art. Excess glycol assures both relatively low polyester product molecular weight with concomitant tractable viscosity, and the presence of essentially only hydroxyl end groups and a low acid number, which is preferably less than 2. The glycols useful herein include ethylene glycol, di-, tri-, tetra- and penta-ethylene glycol, propylene glycol, di-, tri-, tetra- and pentapropylene glycol and mixtures thereof. The most preferred polyester of the present invention is based on a mixture of the ethylene and propylene glycol types.

The aromatic dicarboxylic acids employed in the preparation of the polyesters contain two carboxylic groups either in the form of the free acids or the corresponding anhydrides thereof. The term "aromatic" means an aromatic nucleus having from 6 to 12 carbon atoms and is inclusive of benzene, toluene, xylene, naphthalene, and nuclei having the formula

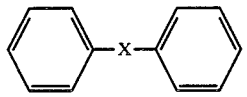

wherein X is selected from the group consisting of —SO$_2$—,

—O—, lower alkylene of from C$_1$ to C$_4$, and a direct linkage between the two benzene nuclei. It will be readily apparent to one skilled in the art that all of the carboxylic groups need not be substituted on the same aromatic ring and the aromatic nucleus can be additionally substituted by other groups so long as the additional groups are not reactive with carboxylic or hydroxyl groups.

Illustrative of the aromatic acids useful herein include isophthalic acid, terephthalic acid, phthalic acid and the anhydrides thereof, 3,4-toluenedicarboxylic acid and the anhydride thereof, 1,5-naphthalenedicarboxylic acid, 4,4'-dicarboxydiphenyl, 4,4'-dicarboxydiphenyl-sulfone, 4,4'-dicarboxybenzophenone, 4,4'-dicarboxydi-phenylether, 4,4'-dicarboxydiphenylmethane, and the like.

A preferred group of carboxylic acids consists of phthalic acid, isophthalic acid, terephthalic acid, and the corresponding anhydrides thereof. A particularly preferred acid consists of phthalic acid and/or the corresponding anhydride thereof.

The molar proportions of glycol and carboxylic acid employed are such that there is an excess of glycol over the stoichiometric amount of one mole of glycol required for reaction with each mole of dicarboxylic acid. It will be readily apparent to one skilled in the art that the term carboxylic group refers to the carbonyl function regardless of whether it appears as part of an anhydride or, as a free acid.

The reaction between the glycol and the acid is carried out under normal esterification conditions well known and described in the prior art; see for example Polyurethanes Chemistry and Technology, Part I, pages 45–46, 1962, J. H. Saunders and K. C. Frisch, John Wiley & Sons, New York, N.Y. Illustratively, the esterification is conducted in the absence of solvent under a flow of nitrogen and at temperatures from about 150° C. to about 250° C., preferably from about 190° C. to about 225° C. for a period from about 4 hours to about 40 hours, preferably from about 6 hours to about 24 hours. The acid number of the product is usually from about 1 to about 4 and preferably is below about 2. During the reaction period, water which is formed is removed overhead.

Advantageously, catalysts are employed which shorten the esterification period. Exemplary catalysts include p-toluenesulfonic acid, magnesium oxide, calcium oxide, antimony oxide, zinc oxide, lead oxide, magnesium acetate, calcium acetate, zinc acetate, lead acetate, sodium acetate, potassium acetate, sodium 2-ethyl hexanoate, potassium 2-ethyl hexanoate, various organic amines, sodium methoxide, potassium methoxide, sodium alkoxytitanates, tetralkyltitanates, hydrated monobutyl tin oxide, stannous oxalate, stannous chloride dihydrate, and the like. Optionally there can be added to the polyesters, either during preparation or afterwards, preservatives, antioxidants, and other suitable adjuvants.

The polyester diols produced in accordance with the method outlined above are characterized by OH numbers of from about 50 to about 500 and preferably from about 100 to about 400.

Also useful as the polyester diol are the reaction products of polyalkylene terephthalate (and specifically polyethylene and/or polypropylene and/or polybutylene terephthalate) with the above-noted glycols. Examples of said polyesters and the methods of preparation thereof are known and described, for example, in U.S. Pat. Nos. 4,048,104, 4,223,068 and 4,417,001, the disclosures of which are herein incorporated by reference. Also useful are the reaction products of dimethyl-terephthalate (DMT) with the above-noted glycols as well as reaction products of the above-noted glycols with mixtures of DMT with various biphenyl esters. Mixtures of DMT with such esters are commercially available (DMT/HBR from DuPont, or TERATES from Hercules) (see also U.S. Pat. No. 4,411,949). Transesterification products in general are also useful provided the products have the structure noted. Regardless of the specific polyester used, it must have the hydroxyl number and structure noted.

The second essential component of the blend of the present invention is the organic compound having from 3 to 8 OH groups and being selected from the group consisting of (i) compounds having OH numbers of from about 250 to about 1830 and being free of carboxylic acid ester groups, (ii) compounds having OH numbers of from about 150 to about 1000 and containing at least one carboxylic acid ester group, and (iii) mixtures thereof. Suitable materials having OH numbers of from about 250 to about 1830 and being free of carboxylic acid ester groups include, (a) hexane triol, pentaerythritol, sorbitol, methyl glycoside, sucrose, glycerol, trimethylol propane, trimethylolethane, quinitol, mannitol and the like, and (b) the reaction products of said materials with an alkylene oxide such as ethylene oxide, propylene oxide, 1,2-butylene oxide, and the like. Also useful are alkoxylated (and preferably ethoxylated and/or propoxylated) amines such as toluene diamine, ethylene diamine, ethanolamine, diethanolamine, and the like.

Suitable materials having OH numbers of from about 150 to about 1000 and containing at least one carboxylic acid ester group include reaction products of carboxylic acids and di- and higher ols. Suitable acids include adipic, phthalic, trimellitic, hemimellitic, trimesic, dimethylol propionic and the like. Suitable di- and higher ols include those generally known and used in the art. The reactants are selected such that the resultant compound contains from 3 to 8 hydroxyl groups and has an OH number of from about 150 to about 1000.

In general, the amount of 3 to 8 OH-functional material is in the range of from about 2 to about 40 percent by weight. It is preferred, however, that the amount of such material be dependent upon the OH number of the material. Thus, if the 3 to 8 OH-functional material used has an OH number of from about 800 to about 1830, it is preferred that the amount used be from about 2 to about 8 percent by weight. Similarly, if the 3 to 8 OH-functional material is ester-group free and has an OH number of from about 250 to less than 800, it is preferred that the amount used be from about 10 to about 30 percent by weight. Finally, if the 3 to 8 OH-functional material contains at least one ester group and has an OH number of from about 150 to about 1000, it is preferred that the amount used be from 15 to 40% by weight.

Component (c) of the blend of the present invention is a condensation product formed from 1 mole of a phenol and from 4 to 15 moles, and preferably from 7 to 12 moles, of ethylene oxide. The phenol to be employed in the reaction is an aromatic compound containing one hydroxyl group attached directly to the aromatic nucleus and having a hydrogen atom on one or more of the ring positions ortho and para to the hydroxyl group and which is otherwise unsubstituted or substituted with substituent groups which are non-reactive under the reaction conditions. Substituent groups that may be present include alkyl, cycloalkyl, aryl, halo, nitro, carbalkoxy, and haloalkyl. The phenol compound is preferably further characterized by a molecular weight within the range of from about 94 to about 500. Examples of acceptable phenols include o-, m-, or p-cresols, ethylphenol, nonylphenol, octylphenol, p-phenylphenol, p-dodecylphenol, $\beta$-naphthol, $\beta$-hydroxyanthracene, p-chlorophenol, o-chlorophenol, o-bromophenol, p-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-carbethoxyphenol and 4-chloromethylphenol. Nonylphenol is the presently preferred phenol. Ethylene oxide is reacted with the phenol in the molar ranges noted. The presently preferred material is IGEPAL CO-630, available from GAF.

The last component of the blend of the invention is a diol of the structure

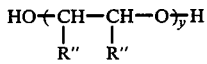

where R" and y are as defined earlier. The diols useful are the same as used to make the polyester component (a). The diols (d) may be introduced in the polyester (a) as free, unreacted diol.

In preparing the foam of the invention, the isocyanate used is a polyphenyl polymethylene polyisocyanate having a viscosity of from about 100 to about 2500 mPa.s at 25° C., preferably from about 400 to about 2500 mPa.s at 25° C., and most preferably from about 500 to about 1000 mPa.s at 25° C. Such isocyanates are known and available.

Also necessary in producing the foam of the invention are blowing agents and catalysts. According to the present invention, readily volatile organic substances may be used as blowing agents. Suitable organic blowing agents include, for example, acetone, ethyl acetate, halogenated alkanes (such as methylene chloride chloroform, ethylidene chloride, vinylidene chloride, monofluorotrichloromethane and chlorodifluoromethane), butane, hexane, heptane or diethylether. The effect of a blowing agent may also be obtained by adding compounds which decompose at temperatures above room temperature to liberate gases, such as nitrogen, for example, azo compounds, such as azoisobutyric acid nitrile. Other examples of blowing agents and details about the use of blowing agents may be found in Kunststoff-Handbuch, Volume VII, published by Vieweg-Hochtlen, Carl-Hanser-Verlag, Munich, 1966, for example, on pages 108 and 109, 453 to 455 and 507 to 510.

Compounds which readily initiate polymerization reaction of the NCO-groups at temperatures as low as room temperature are used as catalysts for polymerization. Compounds of this type are described, for example, in French Pat. No. 1,441,565, Belgian Pat. Nos. 723,153 and 723,152 and German Pat. No. 1,112,285.

Such catalysts are, in particular mononuclear or polynuclear Mannich bases of condensable phenols, oxo-compounds and secondary amines which are optionally substituted with alkyl groups, aryl groups or aralkyl groups, preferably those in which formaldehyde is used as the oxo-compound and dimethylamine as the secondary amine. More or less large proportions of carbodiimide structures generally occur in the foams, as shown by IR spectroscopy, depending on conditions, especially the reaction temperature attained.

Other suitable catalysts are the salts of the alkali metals or alkaline earth metals of carboxylic acids and phenols. The quantity of polymerization catalysts is essentially determined by the type (and if necessary the basicity) of the catalysts. From 0.1 to 100%, by weight, of catalyst in relation to the isocyanate may generally be used.

According to the present invention, conventional catalysts may be used for the polyurethane reaction, for example, tertiary amines, such as triethylamine, tributylamine, N-methyl morpholine, N-ethyl-morpholine, N-coco-morpholine, N,N,N',N'-tetramethylethylenediamine, 1,4-diaza-bicyclo-(2,2,2)octane, N-methyl-N'-dimethylaminoethyl-piperazine, N,N-dimethylbenzylamine, bis-(N,N-diethylaminoethyl)adipate, N,N,-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole and 2-methylimidazole. The known Mannich bases obtained from secondary amines, such as dimethylamine, and aldehydes, preferably formaldehyde, or ketones, such as acetone, methyl ethyl ketone or cyclohexanone, and phenols, such as phenol, nonylphenol, or bis-phenol, may also be used as catalysts.

Tertiary amines containing isocyanate-reactive hydrogen atoms used as catalysts include, for example, triethanolamine, triisopropanolamine, N-methyldiethanolamine, N-ethyl-diethanolamine, N,N-dimethylethanolamine and the reaction products thereof with alkylene oxides such as propylene oxide and/or ethylene oxide.

Silaamines having carbon-silicon bonds as described, for example, in German Pat. No. 1,229,290 (corresponding to U.S. Pat. No. 3,620,984) may also be used as catalysts, for example 2,2,4-trimethyl-2-silamorpholine and 1,3-diethylaminomethyl-tetramethyldisiloxane.

The catalysts used may also be basic nitrogen compounds, such as tetraalkylammonium hydroxides, alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organic metal compounds, in particular organic tin compounds, may be used as catalysts.

Suitable organic tin compounds are preferably tin(II)-salts of carboxylic acids, such as tin(II)-octoate, tin(II)-ethylhexoate and tin(II)-laurate, and the tin(IV)-compounds, for example dibutyl tin oxide, dibutyl tin dichloride, dibutyl tin diacetate, dibutyl tin dilaurate, dibutyl tin maleate or dioctyl tin diacetate. All of the above-mentioned catalysts may be used as mixtures.

Further representatives of catalysts which may be used according to the present invention, as well as details on the mode of operation of the catalyst are described in Kunststoff-Handbuch, Volume III, published by Vieweg-Hochtlen, Carl-Hanser-Verlag, Munich 1966, for example on pages 96 to 102.

The catalysts are generally used in a quantity of from about 0.001 to 10%, by weight, based on the quantity of the polyesters used according to this invention.

The invention is further illustrated, but is not intended to be limited by the following examples in which all parts and percentages are by weight unless otherwise specified.

EXAMPLES

Example 1

A polyester diol is prepared by reacting 356.4 parts phthalic anhydride with 302 parts diethylene glycol, 344.7 parts dipropylene glycol and 60.8 parts tripropylene glycol in the presence of 0.2 parts of FASCAT 4100 (hydrated monobutyltin oxide, available from M&T Chemicals) in a standard polyester reactor with removal of water at a temperature of 215° C. until an acid number of 1.2 is achieved. A reaction product (weighing 1000 parts) is obtained having an OH number of 340 with a viscosity of 1780 mPa.s at 25° C. The product analyzes for free glycols as follows: 9.2% diethylene glycol, 16.9% dipropylene glycol and 3.8% tripropylene glycol.

Example 2

A polyester diol is prepared as in Example 1 by reacting 386.7 parts phthalic anhydride with 465.3 parts diethylene glycol, 177.1 parts dipropylene glycol and 31.2 parts tripropylene glycol in the presence of 0.2 parts of FASCAT 4100 until an acid number of 0.25 is attained. A reaction product (weighing 1000 parts) is obtained having an OH number of 339 with a viscosity of 1948 mPa.s at 25° C. The product analyzes for free glycols as follows: 16% diethylene glycol, 7% dipropylene glycol and 2% tripropylene glycol.

Example 3

A polyester diol is prepared as in Example 1 by reacting 419 parts phthalic anhydride with 632 parts diethylene glycol in the presence of 1 part of FASCAT 4100 until an acid number of 0.4 is achieved. A reaction product (weighing 1000 parts) is obtained with an OH number of 323 and a viscosity of 2224 mPa.s at 25° C. The product contains 24% diethylene glycol.

Example 4

A polyol blend was made by mixing 72 parts of the reaction product of Example 1, 18 parts Multranol 4030 (a sucrose polyether having OH number of 380, available from Mobay Chemical Corporation), and 10 parts GAF Igepal CO-630 (a nonylphenol ethoxylate with approximately 9 moles ethylene oxide per mole, OH number 91).

Example 5

A polyol blend was made by mixing 65 parts of the reaction product of Example 1, 26 parts Multranol 4030 and 9 parts Igepal CO-630.

Examples 6–12

Foam insulation panels were prepared on a double conveyor laminator. The urethane-modified isocyanurate foams were prepared using formulations having the components (in parts by weight) shown in Table I.

The foams were prepared by mixing components A and B. The polyisocyanate was the sole component of the A side while the B side ingredients, which are listed in Table I, were premixed and observed prior to being reacted with the polyisocyanate. The B side was clear without turbidity with no separation of trichlorofluoromethane.

TABLE I

| Components (parts by wt.) | Example | | | | | | |
|---|---|---|---|---|---|---|---|
| | 6 | 7 | 8 | 9 | 10 | 11 | 12 |
| Polyol blend of Example 4 | 100.0 | 100.0 | 100.0 | 100.0 | 100.0 | — | — |
| Polyol blend of Example 5 | — | — | — | — | — | 100.0 | 100.0 |
| Surfactant DC-193[1] | 2.7 | 2.5 | 4.2 | 3.5 | 2.8 | 2.5 | 2.5 |
| Potassium Hex-Cem 977[2] | 2.7 | 3.7 | 3.5 | 4.2 | 4.5 | 2.0 | 2.0 |
| DMP-30[3] | 0.9 | — | — | — | — | 0.7 | 0.7 |
| Water | — | — | — | — | 0.5 | — | — |
| Trichlorofluoromethane | 44.0 | 50.0 | 55.0 | 70.0 | 58.0 | 43.0 | 43.0 |
| Component B | 150.3 | 156.2 | 162.7 | 177.7 | 165.8 | 148.1 | 148.1 |
| Mondur MR[4], Component A | 178.0 | 179.0 | 199.0 | 219.0 | 261.0 | 178.0 | — |
| Mondur E-489[5], Component A | — | — | — | — | — | — | 178.0 |

TABLE I-continued

| Components (parts by wt.) | Example | | | | | | |
|---|---|---|---|---|---|---|---|
| | 6 | 7 | 8 | 9 | 10 | 11 | 12 |
| NCO/OH index | 2.25 | 2.25 | 2.5 | 2.75 | 3.0 | 2.25 | 2.25 |

Footnotes to Table I:
[1]DC-193 is a silicone surfactant supplied by Dow Corning, Midland, Michigan.
[2]Potassium Hex-Cem 977 catalyst supplied by Mooney Chemicals, Inc. of Cleveland, Ohio which contains 15% potassium as potassium 2-ethyl hexanoate in a carrier of diethylene glycol.
[3]DMP-30 catalyst supplied by Rohm & Haas Company of Philadelphia, PA, which is 2,4,6-trisdimethylamimomethylphenol.
[4]Mondur MR - a polyphenylpolymethylene polyisocyanate having an NCO content of about 32% and a viscosity of about 200 mPa·s at 25° C., available from Mobay Chemical Corporation.
[5]Mondur E-489 - a polyphenylpolymethylene polyisocyanate having an NCO content of about 31% and a viscosity of about 700 mPa·s at 25° C., available from Mobay Chemical Corporation.

Laminate processing was at component temperatures for B/A of around 70/70° F. Conveyor temperatures were about 130°-140° F. The insulation panels were made using the facing skins, both top and bottom, listed in Table II. A brief description of the facing skins utilized follows:

(1) Manville GlassThane—an asphalt emulsion coated fiberglass specialty mat of relatively light weight, typically about 3 lbs. per 100 sq. ft. of which about 1.4 lbs. weight is specialty fiberglass mat and 1.6 lbs. weight is asphalt, per 100 sq. ft., as described in U.S. Pat. No. 4,186,236, manufactured by the Manville Corporation of Denver, Colo.

(2) Manville Durafoil—a laminated skin produced from a specialty fiberglass mat weighing 1.4 lbs. per 100 sq. ft.—adhesive—aluminum foil of 0.3 or 0.7 mil thickness. The facer laminate has a total thickness of about 10 to 15 mils.

(3) Manville Duraglas—an all-glass-facer (AGF) specialty fiberglass mat manufactured by Manville Corporation.

The resulting foam insulation panels were subjected to physical tests which gave the results shown in Table II.

The urethane-modified isocyanurate foam panels produced in Table II have excellent fire performance properties exhibited by their passing the Factory Mutual calorimeter test for metal deck roof construction.

Example 13

The formulation of Example 7 was used to produce laminated boardstock utilizing the Manville Duraglas all-glass-facer (AGF).

Example 14

The formulation of Example 7 only substituting Mondur E-489 polyisocyanate for Mondur MR was used to produce laminated boardstock utilizing the Manville Duraglas all-glass-facer (AGF).

There was noticeably more bleed-through of the liquid foam components through the facer material in Example 13 utilizing Mondur MR polyisocyanate as compared to Example 14 utilizing Mondur E-489 polyisocyanate, where there was virtually none. The all-glass-facers are of a somewhat porous nature and after a number of hours excessive bleed-through causes sticking and laminator shut-down.

TABLE II

| | Example | | | | | | |
|---|---|---|---|---|---|---|---|
| | 6 | 7 | 8 | 9 | 10 | 11 | 12 |
| Thickness, inches | 1.2 | 1.4 | 1.2 | 1.2 | 1.2 | 1.5 | 1.5 |
| Facer material | Durafoil | GlassThane | Durafoil | GlassThane | GlassThane | Durafoil | Durafoil |
| Density, pcf | | | | | | | |
| foam overall | 2.07 | 1.91 | 1.85 | 1.90 | 2.11 | 1.98 | 1.94 |
| board overall | 2.40 | 2.46 | 2.15 | 2.61 | 2.92 | 2.24 | 2.19 |
| foam, cut core | 1.83 | 1.54 | 1.68 | 1.50 | 1.74 | — | — |
| Compressive yield[1], psi | 17.3 | 18.0 | 16.6 | 15.2 | 19.7 | 14.4 | 17.7 |
| Thermal stability[2], % volume change, 1 week at 100° C., amb. R.H. | 5.7 | 4.0 | 4.3 | 4.9 | 1.6 | 2.7 | 2.9 |
| Hydrolytic stability[2], % volume change, 1 week at 70° C. and 100% R.H. | 5.4 | 8.2 | 6.2 | 7.3 | 2.3 | 5.6 | 3.7 |
| Cold shrinkage[2], % volume change, 1 week at −30° C., amb. R.H. | −0.2 | −0.7 | −0.8 | −0.1 | −0.2 | −0.1 | −0.2 |
| Factory Mutual Calorimeter Fire Test* | | | | | | | |
| in Built-Up-Roof (BUR) testing | — | Class 1 | — | Class 1 | Class 1 | — | — |
| in one-ply testing | Class 1 | — | Class 1 | — | — | Class 1 | Class 1 |
| Foam corefriability[3], % weight loss | 5 | | | 12-15 | 19 | | |
| K-factor[4], initial (1 day) | .113 | .125 | .116 | .128 | .134 | .115 | .110 |
| Btu/(hr)(ft²)(°F./in.), 6 mos. | .141 | .159 | .156 | .171 | .166 | .152 | .135 |
| Number of cells per inch | — | — | — | — | — | 206 | 236 |

Footnotes to Table II:
[1]ASTM D-1621
[2]ASTM D-2126
[3]ASTM C-421
[4]ASTM D-2326

What is claimed is:

1. A polyol blend comprising:
   (a) from about 30 to about 90 percent by weight of a polyester diol having an OH number of from about 50 to about 500 and having the structure:

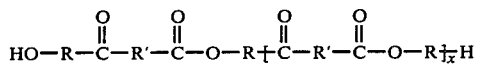

wherein each R may be the same or different and represents a radical of the formula:

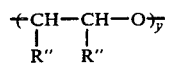

where R" represents H or CH₃ with the proviso that both R"s cannot be CH₃, and y represents a number of from 1 to 5,
   wherein R' represents an aromatic radical having from 6 to 12 carbon atoms, and
   wherein x represents a number of from 0 to 5,
   (b) from about 2 to about 40 percent by weight of an organic compound containing from 3 to 8 hydroxyl groups and being selected from the group consisting of
      (i) compounds having OH numbers of from about 250 to about 1830 and being free of carboxylic acid ester groups,
      (ii) compounds having OH numbers of from about 150 to about 1000 and containing at least one carboxylic acid ester group, and
      (iii) mixtures thereof,
   (c) from about 5 to about 30 percent by weight of a condensation product formed from 1 mole of a phenol and from 4 to 15 moles of ethylene oxide, and
   (d) from 0 to about 40 percent by weight of at least one diol of the structure:

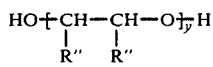

where R" and y are as defined above.

2. The blend of claim 1 wherein the amount of component (a) is from about 35 to about 75 percent by weight.

3. The blend of claim 1 wherein the hydroxyl number of said polyester diol is from about 100 to about 400.

4. The blend of claim 3 wherein said polyester diol is derived from 1 mole of an aromatic dicarboxylic acid anhydride and from 1.5 to 4 moles of a glycol mixture, with said mixture comprising
   (i) from 25 to 50 mole percent of one or more of the following: propylene glycol, dipropylene glycol, tripropylene glycol, tetrapropylene glycol and pentrapropylene glycol, and
   (ii) from 50 to 75 mole percent of one or more of the following: ethylene glycol, diethylene glycol, triethylene glycol, tetraethylene glycol and pentaethylene glycol, the sum of said mole percents equalling 100 percent.

5. The blend of claim 4 wherein said acid anhydride is phthalic anhydride.

6. The blend of claim 3 wherein said polyester diol is the reaction product of
   (i) a glycol selected from the group consisting of propylene glycol, dipropylene glycol, tripropylene glycol, tetrapropylene glycol, pentapropylene glycol, ethylene glycol, diethylene glycol, triethylene glycol, tetraethylene glycol, pentaethylene glycol and mixtures thereof and
   (ii) a material selected from the group consisting of
      (a) polyethylene, polypropylene and/or polybutylene terephthalate,
      (b) dimethyl terephthalate, and
      (c) mixtures of dimethyl terephthalate and biphenyl esters.

7. The blend of claim 1 wherein the amount of component (b) is from about 5 to about 30 percent by weight.

8. The blend of claim 1 wherein the amount of component (c) is from about 5 to about 20 percent by weight.

9. The blend of claim 1 wherein component (c) is the condensation product formed from 1 mole of a phenol and from 7 to 12 moles of ethylene oxide.

10. The blend of claim 1 wherein said phenol is nonylphenol.

11. The blend of claim 1 wherein the amount of component (d) is from about 5 to about 30 percent by weight.

12. The blend of claim 1 wherein the amounts of components are as follows:
   (a) from about 35 to about 75 percent by weight,
   (b) from about 5 to about 30 percent by weight,
   (c) from about 5 to about 20 percent by weight, and
   (d) from about 5 to about 30 percent by weight.

13. A polyisocyanurate/polyurethane foam prepared by reacting
   (A) a polyol blend comprising:
      (a) from about 20 to about 90 percent by weight of a polyester diol having an OH number of from about 50 to about 500 and having the structure:

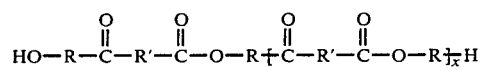

wherein each R may be the same or different and represents a radical of the formula:

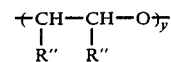

where R" represents H or CH₃ with the proviso that both R"s cannot be CH₃, and y represents a number of from 1 to 5,
   wherein R' represents an aromatic radical having from 6 to 12 carbon atoms, and
   wherein x represents a number of from 0 to 5,
      (b) from about 2 to about 40 percent by weight of an organic compound containing from 3 to 8 hydroxyl groups and being selected from the group consisting of (i) compounds having OH numbers of from about 250 to about 1830 and being free of carboxylic acid ester groups, (ii) compounds having OH numbers of from about 150 to about 1000 and containing at least one carboxylic acid ester group, and (iii) mixtures thereof, (c) from about 5 to about 30 percent by weight of a condensation product formed from 1 mole of a phenol and from 4 to 15 moles of ethylene oxide, and (d) from 0 to about 40 percent by weight of at least one diol of the structure:

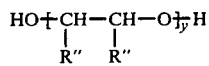

where R" and y are as defined above, and (B) a polyphenyl polymethylene polyisocyanate having a viscosity of from about 100 to about 2500 mPa.s at 25° C., in the presence of a catalyst and a blowing agent, the amounts of components being such that the isocyanate index is from about 140 to about 500.

14. The foam of claim 13 wherein said index is from about 140 to about 300.

15. The foam of claim 13 wherein the viscosity of said isocyanate is from about 400 to about 2500 mPa.s at 25° C.

16. The foam of claim 15 wherein said viscosity is from about 500 to about 1000 mPa.s at 25° C.

* * * * *